United States Patent Office 2,827,910
Patented Mar. 25, 1958

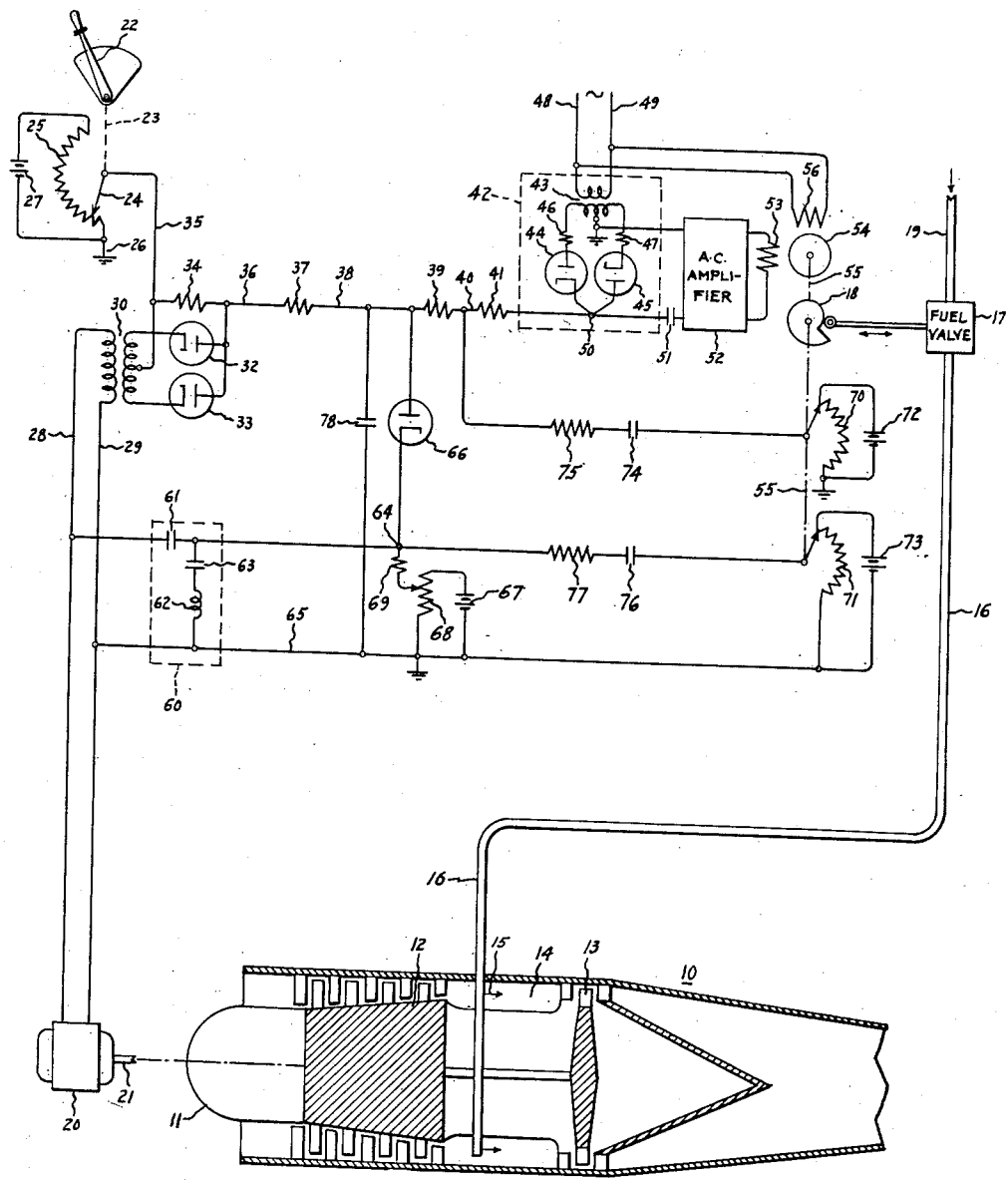
March 25, 1958  B. A. WELLS ET AL  2,827,910
ELECTRICAL SPEED CONTROL SYSTEM FOR ENGINES
Filed Dec. 29, 1951
Inventors:
Bruce A. Wells,
Clinton C. Lawry,
by Richard E. Hosley
Their Attorney.

2,827,910

ELECTRICAL SPEED CONTROL SYSTEM FOR ENGINES

Bruce A. Wells and Clinton C. Lawry, Schenectady, N. Y., assignors to General Electric Company, a corporation of New York Application December 29, 1951, Serial No. 264,178

6 Claims. (Cl. 137—30)

This invention relates to improved engine speed control and regulating systems and more particularly to such systems which are especially adapted for engines having high rotational speeds such as gas turbines.

In power plants such as gas turbines, a wide range of operating speeds is normally required. As in other power plants, in gas turbines which are used for jet propulsion of aircraft the turbine speed is generally proportional to the power output or thrust available from the power plant since the speed determines the volume of gases handled by the power plant and discharged therefrom. However, upon changes in altitude and speed of the aircraft, the amount of fuel required to maintain a particular engine speed is likely to vary over a wide range. It is therefore advantageous to employ an automatic speed regulating system which will vary the fuel input to the power plant, as required, in order to maintain a selected speed. Systems which will accomplish this broad result are known.

However, in aircraft power plants, it is extremely advantageous to provide a system having very fast response in order to permit immediate acceleration of the power plant when such acceleration is needed. On the other hand, it is extremely important that the maximum safe operating speed of the power plant should not be exceeded in order that overspeed destruction should not occur. It will also be understood that, when maximum power output is desired, it is desirable to operate the power plant at a speed which is as close to the maximum permissible speed as possible without danger of overspeed destruction.

It is therefore an object of this invention to provide an improved speed control system for a gas turbine power plant providing for maximum rates of speed change, automatic control of speed at a selected value, and automatic maintenance of a maximum permissible speed within very narrow limits.

It is a further object of this invention to provide an automatic system for maintaining power plant speed at a preselected value in which the speed overshoot above the selected value upon acceleration is substantially prevented when such speed overshoot would cause an excess of speed above the predetermined safe maximum.

It is another object of this invention to provide an improved speed control system having a suitable amplification gain over a wide range of selected speeds, and having a much higher gain in the automatic control of maximum speed.

Another object of this invention is to provide an improved power plant speed control system for automatically maintaining a wide range of selected speeds in which a suitable stabilization signal is provided to prevent system instability while permitting fast system response in the range of speeds below maximum speed, and having a higher degree of stabilization upon approach of the engine to maximum speed, in order to prevent substantial speed overshoot.

In carrying out the objects of this invention, an electrical speed control system may be employed in which a speed selector device selects a direct current voltage corresponding to the speed desired, the rectified output of a tachometer generator is employed to indicate the speed attained, and this output is subtracted from the voltage of the speed selector in order to obtain a speed error signal. The resulting direct current voltage speed error signal is amplified and employed to cause adjustment of a power plant fuel valve in a direction dependent upon the polarity of the error signal in order to obtain a speed adjustment. A frequency responsive circuit is provided in connection with the tachometer generator which is responsive to the tachometer generator frequency attained at maximum power plant speed. A rectifier, normally biased to cut-off, is connected between the frequency responsive circuit and the direct current voltage error signal circuit and arranged to become conductive upon the attainment of voltage amplitudes in the output of the frequency responsive circuit corresponding to maximum permissible power plant speed to overcome the direct current voltage circuit and prevent further speed increase regardless of the requirements of the speed setting device.

For a better understanding of this invention reference should be made to the following specification and the accompanying drawing which is a schematic diagram of a preferred embodiment of this invention.

Referring more particularly to the drawing, an aircraft gas turbine power plant is schematically shown at 10, having a rotor 11 including a compressor 12 and a turbine wheel 13. Between compressor 12 and turbine 13 are combustion chamber or chambers 14 into which liquid fuel may be introduced as indicated at 15 from a fuel line 16. The flow of fuel may be controlled by a suitable fuel valve schematically shown at 17 which may provide for a fuel flow proportional to the setting of a positioning device such as a cam 18. The fuel may be pumped from a fuel reservoir by a suitable fuel pump (neither of which is shown) and supplied to the fuel valve through a conduit 19.

The power plant 10 is provided with an alternating current voltage generating tachometer generator 20 which may be connected directly, as schematically shown at 21, or through suitable gearing to the rotor 11.

A thrust selector 22 is provided for the power plant operator which is connected to a shaft schematically shown at 23 to the moving contact arm 24 of a speed selecting potentiometer 25. As will be seen, the lower end of speed selector potentiometer 25 is grounded at 26 and a direct current voltage is applied across the potentiometer by a suitable voltage source such as a battery 27. Battery 27 may be connected so that the upper end of potentiometer 25 is at a positive voltage above ground. The thrust selector 22 and potentiometer 25 may therefore be arranged so that upon a change in the setting of the thrust selector lever requiring a higher thrust, or power output, the moving contact arm 24 is moved higher on the potentiometer 25 so that this moving contact is at a higher positive direct current voltage above ground in order to select a higher power plant speed.

The output voltage of tachometer generator 20 is applied through connections 28 and 29 to a transformer 30 and the output from this transformer is rectified by a full wave rectifier including diodes 32 and 33 to produce a direct current voltage across an output resistor 34 which is proportional to the tachometer voltage and therefore proportional to the speed of the power plant. It will be understood of course that the full wave rectifier formed by the diodes 32 and 33 may include suitable filter elements to obtain a smooth direct current output as is well known in the art. It will be seen that the left end of the rectifier output resistor 34 is connected through a conductor 35 to the contact arm 24 of speed selector potentiometer 25. The voltages from the speed selector potentiometer 25 and the speed indicating rectifier circuit are thereby connected in opposition so as to balance one another when the speed selected by the positioning of potentiometer 25 is attained by the power plant. Under such balanced conditions, the voltage level at the combined output connection 36 is at zero with respect to ground. Upon selection of a new speed on the speed selector potentiometer or upon a change in operating conditions of the power plant causing the speed to vary from the speed selected, a positive or negative direct current voltage, or error signal, appears at 36 corresponding to the magnitude and direction of the actual speed error. The speed error, of course, is the difference between the speed selected at the speed selector potentiometer 25 and the actual speed attained as indicated by the rectified output of the tachometer generator 20. As the system is shown, a positive voltage above ground at point 36 constitutes a low speed signal for raising the fuel input and a negative voltage below ground, a high speed signal for causing a decrease in fuel input.

The direct current voltage appearing at point 36 is normally transmitted through a resistor 37, a connection 38, a resistor 39, a connection 40, and resistor 41 to a voltage inverter 42. Inverter 42 may be variously characterized as a "chopper," or a precision inverter, which transforms the direct current voltage transmitted from connection 36 into an alternating current voltage having a magnitude proportional to the direct current error signal but having a phase relationship dependent upon the polarity of the direct current error signal. That is, the inverter output will be displaced in phase by 180 degrees for a positive input voltage with respect to the output for a negative input voltage.

The inverter or chopper 42 is seen to consist of a transformer 43, two diode elements 44 and 45, each connected through current limiting resistors 46 and 47 to the ends of the secondary winding of transformer 43. The center tap of the secondary winding of transformer 43 is grounded. The operation of this inverter is controlled by the frequency of a suitable alternating current supply from connections 48 and 49 to the primary winding of transformer 43. The cathode of diode 44 and the anode of diode 45 are connected together to a connection 50, at which the error voltage signal appears. The operation of this inverter or "chopper" is as follows:

It will be seen from the connections of diodes 44 and 45, that during one half cycle of the alternating voltage induced in the secondary winding of transformer 43, both diodes will conduct in a loop including the transformer secondary, resistor 47, diode 45, diode 44, and resistor 46. During the other half cycle of the alternating voltage, neither of the diodes 44 and 45 will be conductive. It will be seen that, during the conducting half cycle, a voltage connection will effectively exist between point 50 and the grounded center tap of the transformer secondary. The D.-C. error signal voltage appearing at point 50 will therefore be effectively shorted to ground during the conductive half cycle of the diodes 44 and 45. However, during the non-conducting half cycle, no such short circuit will exist, and the D.-C. error voltage will again appear at point 50. This intermittently appearing D.-C. voltage therefore effectively becomes alternating and may be transmitted through a capacitor 51 to an alternating current amplifier 52, which may be of conventional design. The converted error signal is therefore amplified and supplied to a winding 53 of a two-phase positioning motor 54 for energization thereof for rotation in a proper direction to move fuel valve positioning cam 18 through a motor shaft 55 to obtain the desired correction in fuel flow. The motor 54 serves the function of a phase discriminator, to recognize the phase of alternating voltage applied to winding 53 in order to provide the proper direction of rotation. In order to accomplish this, a second winding 56 is necessary which is also energized from the input connections 48 and 49 from the same alternating current voltage source supplying the inverter 42. It will be understood that a 90 degree phase shift is necessary between the voltages supplied to motor windings 56 and 53. This may be accomplished by a proper phase shift network (not shown) connected with either one of these windings. Such a network may be included in amplifier 52.

The amplifier 52 preferably has a high gain characteristic and some form of stabilization is desirable, in addition to the stabilization circuits to be described below, for connection between the motor 54 and the amplifier 52. This stabilization may be provided by conventional means, such as a tachometer generator (not shown) mounted for rotation with motor shaft 55 and connected to supply a stabilization signal to the amplifier 52. This stabilization signal may preferably be of such a magnitude as to provide for a speed of positioning motor 54 approximately proportional to the direct current error voltage signal which is available at connection 40.

A frequency responsive filter 60 may be provided which is connected across the output lines 28 and 29 of the alternating current voltage generating tachometer 20. As shown, this frequency sensitive filter circuit 60 is essentially a high frequency or so-called "high pass" filter employing a series connected capacitor 61 and a parallel connected inductance 62. An additional capacitor 63 may be provided in series with inductance 62 in order to give a more pronounced effect at the desired response frequency. It is seen that the output of this frequency responsive circuit 60 is applied to output lines 64 and 65, and that output line 65 is grounded. The voltage output of the frequency responsive filter circuit 60 is therefore applied through connection 64 to the cathode of a diode 66, the plate of which is connected at 38 in the D.-C. error voltage circuit. Diode 66 is normally biased to cut-off, so that no conduction occurs therethrough, by the application of a direct current positive bias voltage at connection 64. Such a voltage may be derived from a source, such as battery 67, which is connected through an adjusting potentiometer 68 and a series connected resistor 69 to the connection 64.

In operation, if the top speed of the power plant is desired, the power selector 22 is set in the maximum speed position, setting the speed selector potentiometer 25 for that position, to demand a speed which is actually slightly in excess of the maximum permissible speed which is to be maintained. Upon approach to the maximum speed, the frequency of the tachometer generator 20 approaches the frequency to which the filter circuit 60 is designed to respond, so that the amplitude of alternating current voltage which appears at connection 64, and at the cathode of diode 66 increases very rapidly. The amplitude of the negative loops of alternating current voltage then begin to exceed the direct current cut-off voltage from biasing voltage source 67. When these negative voltage loops begin to exceed the bias voltage, and diode 66 begins to become conductive, a depression in the direct current error voltage at point 38 will occur and ultimately the magnitude of these negative voltage loops will be sufficient to cause sufficient conduction in diode 66 to effectively reduce the direct current voltage level of point 38 to ground potential (or transiently to a level even below ground), so that no low speed or speed increasing error signal can be transmitted through resistor 39.

It will be understood that this frequency responsive top speed circuit may have an appreciable range of operation corresponding to the range of current conduction by diode 66. When connection 38 is at ground potential, the voltage responsive circuit from which a positive D.-C. error voltage is derived through connection 36, and the frequency responsive circuit, connected through diode 66, are actually opposing one another and at an equilibrium condition. Upon deviation of engine speed from a point corresponding to this equilibrium condition the direct current voltage at point 38 will vary in a positive or negative direction in order to restore the equilibrium at the maximum speed to be held. This mode of operation exists only in a narrow range of engine speed deviation.

It will be seen then that the frequency responsive filter circuit 60 supplies a signal which, through diode 66, overpowers the selected speed error signal, and constitutes a frequency responsive maximum speed control. Thereafter, as long as the selector demands a speed in excess of the maximum permissible speed, the frequency responsive speed limiting control will remain operative to limit the speed to the desired maximum. One very important feature of this frequency responsive maximum speed control is that it is only a limiting control. That is, it only prohibits positive D.-C. error signals when maximum speed has been attained, which would otherwise further increase the speed, but there is no limitation on negative speed error signals which would reduce fuel flow to decrease speed. It will be seen that the sensitivity or amplification of the frequency responsive speed limit control including the diode 66 can be very high, and the control action which is obtained may be very "stiff" in prohibiting any appreciable overshoot in the power plant speed. This can obviously be done without sacrifice in stability of the system at lower speeds where this control is not effective.

Transient stabilization is also provided in this system by means of potentiometers 70 and 71 which are connected to motor shaft 55 for movement upon any repositioning of the fuel flow adjusting motor 54. These potentiometers are each provided with a source of direct current voltage such as batteries 72 and 73 shown. Stabilization voltage signals are transmitted from each of these potentiometers through the respective capacitor resistor combinations 74, 75, and 76, 77. Resistor 75 is connected at 40 to the direct current voltage error signal circuit and resistor 77 is connected at 64 to the frequency responsive maximum speed limiting circuit. Since the sensitivity or gain of the frequency responsive maximum speed limiting circuit is high, a high stabilization signal for this circuit is appropriate, and the components including voltage source 73, capacitor 76, and resistor 77 are so chosen to provide such a high magnitude stabilization. The operation of such a stabilization circuit is as follows. If a change in the adjustment of the potentiometer 71 occurs, changing the voltage on capacitor 76, such voltage change is immediately initially transmitted to the connection 64, and with a polarity chosen to partially oppose the operation of the circuit to which it is connected. However, the charge on capacitor 76 soon changes so that any difference between the voltage at the sliding contact of potentiometer 71 and the normal voltage at point 64 is completely taken up in the charge voltage across the capacitor 76. The stabilization signal is then no longer existent until another movement of the potentiometer 71 requires another change in the charge on capacitor 76.

It will be seen that the stabilization circuit including capacitor 74 and resistor 75 is effective under all conditions below the maximum permissible power plant speed where the frequency responsive portion of the system is inoperative. In this range of system operation, the stabilization circuit including capacitor 76 and resistor 77 is completely inoperative, since the frequency responsive system to which it is connected is inoperative. The stabilization signal available from the stabilization circuit including capacitor 74 and resistor 75 is not as powerful as that available for the frequency responsive circuit in order that a fast response may be obtained from the direct current voltage error signal circuit over the wide range of speeds for which this system is required to operate. Upon the attainment of maximum permissible speed, however, the higher stabilization signal available from the stabilization circuit including resistor 77 and capacitor 76 provides the main stabilization of the system upon operation of the frequency responsive portion of the system to which it is connected. It will be obvious that a single potentiometer may be used in place of potentiometers 70 and 71, if desired, for energization of both stabilization circuits.

A capacitor 78 is preferably provided between the connection 38 and ground in order to provide a filtering or smoothing effect for the intermittent depression of the direct current error voltage at point 38 by conduction of diode 66 when the frequency responsive circuit becomes operative at the maximum allowable speed.

While only a single embodiment of the invention has been shown and described, it will be understood that many changes and modifications will occur to those skilled in the art without departing from the true spirit and scope of this invention. It is therefore intended that the scope of the invention is to be limited only by the following claims.

What we claim as new and desire to secure by Letters Patent of the United States is:

1. An electrical speed and fuel control system for a fuel burning engine comprising an adjustable speed selector means for selecting a direct current voltage corresponding to a desired speed, means for connection to the engine to be controlled for indicating speed in terms of a direct current voltage, said selector means and said indicating means being connected in series, for combination of the voltages thereof in opposing relationship to derive a speed error signal, a frequency responsive speed indicating means connected in parallel with said series combination and operative upon attainment of a frequency corresponding to the maximum desired speed to prevent the transmission of a direct current error signal voltage of a polarity indicating a low speed condition, an adjustable fuel valve for controlling the flow of fuel, and means connected between the combined outputs of said above-mentioned means and said fuel valve for adjusting the position of said fuel valve in response to off-speed direct current error signals to correct for the speed error indicated.

2. A speed controlling fuel system for an aircraft gas turbine power plant comprising a speed selector device for providing a voltage proportional to the desired speed, a tachometer generator for connection to the power plant to be controlled for detection of the speed thereof, means connected to receive electrical energy from said tachometer generator for deriving a voltage proportional to the voltage generated by said tachometer generator, said means being connected in series opposition to said speed selector device, means for amplifying the voltage from said opposed series connection, a fuel flow control device positionable to govern the rate of fuel flow, and means connected between said amplifying means and said fuel control device for changing the position of said fuel control device in response to the output of said amplifying means, means connected to said tachometer generator and responsive to a frequency thereof corresponding to the maximum desired speed, a connection between said frequency responsive means and said amplifying means for overpowering the signals derived from said opposed series connection which would otherwise cause an increase in fuel flow after maximum speed has been achieved.

3. A fuel control system for an aircraft gas turbine in which the fuel is controlled in accordance with desired turbine speeds comprising a fuel valve for controlling the flow of fuel, electrical positioning means connected to said valve for changing the fuel flow setting thereof, said electrical positioning means being responsive to a direct current voltage of one polarity for adjustment in one direction and to a direct current voltage of the opposite polarity for adjustment in the opposite direction, an energizing circuit for said electrical positioning means comprising an adjustable source of direct current voltage for selecting a desired speed in terms of the adjustment thereof, a second source of direct current voltage connected in opposition to said adjustable source, means including a tachometer generator for connection to the turbine to be controlled for energization of said second source with a voltage proportional to the speed thereof, frequency responsive means connected to said tachometer generator for detection of a maximum allowable speed in terms of the tachometer frequency corresponding thereto, said frequency responsive means being connected to said energizing circuit for overpowering thereof to prevent increase in fuel upon detection of said maximum speed.

4. A speed controlling fuel system for an aircraft gas turbine power plant comprising a speed selector device for providing a voltage proportional to the desired speed, a tachometer generator for connection to the controlled power plant for detection of the speed thereof, means connected to receive electrical energy from said tachometer generator for deriving a voltage proportional to the voltage generated by said tachometer generator and connected in series opposition to said speed selector device, means for amplifying the voltage from said opposed series connection, a fuel flow control device positionable to govern the rate of fuel flow, and means connected between said amplifying means and said fuel control device for changing the position of said fuel control device in response to the output of said amplifying means, means connected to said tachometer generator and responsive to a frequency thereof corresponding to the maximum desired speed, a connection between said frequency responsive means and said amplifying means for overpowering the signals derived from said opposed series connection which would otherwise cause an increase in fuel flow after maximum speed has been achieved, and two transient stabilization networks each comprising a series connected resistor and capacitor connected to at least one voltage device having a voltage changeable upon change in position of said fuel control device, one of said networks being connected to said frequency responsive means and the other of said networks being connected to said amplifying means.

5. A fuel control system for an aircraft gas turbine in which the fuel is controlled in accordance with desired turbine speeds comprising a fuel valve for controlling the flow of fuel, electrical positioning means connected to said valve for changing the fuel flow setting thereof, said electrical positioning means being responsive to a direct current voltage of one polarity for adjustment in one direction and to a direct current voltage of the opposite polarity for adjustment in the opposite direction, an energizing circuit for said electrical positioning means comprising an adjustable source of direct current voltage for selecting a desired speed in terms of the adjustment thereof, a second source of direct current voltage connected in opposition to said adjustable source, means including a tachometer generator for connection to the controlled turbine for energization of said second source with a voltage proportional to speed, frequency responsive means connected to said tachometer generator for detection of a maximum allowable speed in terms of the tachometer frequency corresponding thereto, said frequency responsive means being connected to said energizing circuit for overpowering thereof to prevent increase in fuel upon detection of said maximum speed, variable voltage means connected to said valve for producing voltages varying in response to movement of said valve, first and second transient stabilization networks connected to said variable voltage means for energization thereby, said first network being connected to said frequency responsive means and said second network being connected to said positioning means.

6. A fuel flow control system for an aircraft gas turbine for controlling turbine speed in accordance with the setting of a speed selector device up to a maximum speed regardless of changes in operating conditions comprising a fuel flow control valve adjustable to permit various fuel flow rates, a two phase electrical positioning motor connected to said valve for the positioning thereof, one phase winding of said motor being connected to a continuous source of alternating excitation current, an alternating current amplifier for energizing the other phase winding of said motor, a precision inverter connected between said continuous source of alternating current and said amplifier for energization thereof, an opposed series connected combination of direct current voltage devices for supplying a voltage equal to the difference therebetween and connected to said precision inverter by a series impedance for determining the magnitude and phase of the energy supplied from said inverter to said amplifier, said opposed series connected voltage devices respectively comprising a potentiometer connected to said speed selector device for positioning thereby in accordance with the speed to be selected, a tachometer generator for connection to the controlled turbine for generating an alternating current voltage in accordance with the speed thereof, a rectifier circuit connected to said tachometer generator to provide a rectified output voltage proportional to speed, a resonant filter circuit connected to the output of said tachometer generator and tuned for maximum response at the frequency of said tachometer generator corresponding to the maximum permissible speed, a diode having a cathode normally biased to cut-off but connected to said filter circuit for the initiation of conduction thereby on the attainment of said tuned frequency, the anode of said diode being connected to said opposed series connected combination for reducing and preventing an increase in fuel flow by reduction in said difference voltage supplied to said precision inverter upon the initiation of conduction in said diode to prevent speeds above said maximum, a first transient stabilization circuit comprising a series connected capacitor and resistor connected to the junction of said series impedance and said precision inverter, a second transient stabilization circuit comprising a series connected capacitor and resistor connected to the cathode of said diode, and at least one voltage device connected to said motor for producing a voltage variable upon movement of said motor and connected for energization of said stabilization circuits.

References Cited in the file of this patent

UNITED STATES PATENTS

| 2,492,472 | Fortescue | Dec. 27, 1949 |
| 2,496,730 | Lindbeck | Feb. 7, 1950 |
| 2,582,305 | Young | Jan. 15, 1952 |
| 2,583,339 | Mouzon | Jan. 22, 1952 |
| 2,594,436 | Hornfeck et al. | Apr. 29, 1952 |
| 2,595,034 | Wild | Apr. 29, 1952 |
| 2,609,868 | Carey | Sept. 9, 1952 |
| 2,648,194 | Jorgensen | Aug. 11, 1953 |
| 2,650,471 | Knudsen | Sept. 1, 1953 |
| 2,662,372 | Offner | Dec. 15, 1953 |